United States Patent [19]

Beth et al.

[11] Patent Number: 5,007,564
[45] Date of Patent: Apr. 16, 1991

[54] DOSING OR FEEDING APPARATUS FOR PRECISELY FEEDING LOOSE BULK MATERIAL

[75] Inventors: Matthias Beth, Griesheim; Hansgeorg Binz, Eschborn; Ludger Toerner, Eppertshausen, all of Fed. Rep. of Germany

[73] Assignee: Carl Schenck AG, Darmstadt, Fed. Rep. of Germany

[21] Appl. No.: 357,311

[22] Filed: May 25, 1989

[30] Foreign Application Priority Data

May 30, 1988 [DE] Fed. Rep. of Germany ....... 3818338

[51] Int. Cl.$^5$ .............................................. G01F 13/00
[52] U.S. Cl. .................... 222/217; 222/220; 222/236; 222/239; 222/342; 222/345; 222/367; 222/408; 222/77
[58] Field of Search ................... 222/58, 77, 408, 410, 222/55, 217, 220, 225, 226, 236, 239, 240, 342, 344, 345, 367; 366/184; 141/83

[56] References Cited

U.S. PATENT DOCUMENTS

| 1,936,105 | 11/1933 | Cole ................. | 222/239 X |
| 1,939,703 | 12/1933 | Hunt et al. ......... | 222/239 |
| 4,585,148 | 4/1986 | Ito .................. | 222/77 |
| 4,635,819 | 1/1987 | Wilson et al. ....... | 222/58 |

FOREIGN PATENT DOCUMENTS

| 72779 | 7/1951 | Denmark ............. | 222/225 |
| 0112398 | 7/1984 | European Pat. Off. . | |
| 2636521 | 2/1978 | Fed. Rep. of Germany . | |
| 2456344 | 1/1981 | France .............. | 222/58 |
| 55-52829 | 4/1980 | Japan ............... | 222/58 |

Primary Examiner—David H. Bollinger
Attorney, Agent, or Firm—W. G. Fasse

[57] ABSTRACT

A dosing or metering feeding apparatus for precisely feeding a stream of powdered or fine grained loose bulk material includes a cylindrical container (1) for storing the loose material (3). A rotating turntable (4) essentially closing the bottom of the container (1). A discharge groove (6) is located in the turntable around the circumference of the turntable (4), whereby the discharge groove (6) opens radially outwardly. A stripper is arranged to reach into the discharge groove (6) for stripping the dosed material (3) from the discharge groove (6) and for discharging the dosed or metered material. This arrangement provides a clearly defined discharge rate of the loose material. The discharge rate may be simply adjusted to different desired feed rates by varying the rotational speed of the turntable (4). A high dosing or metering precision is achieved. The dosing apparatus may be used together with a weighing scale for carrying out a gravimetric feeding by controlling the turntable drive in closed loop fashion by a control signal derived from the weighing scale.

16 Claims, 4 Drawing Sheets

DOSING OR FEEDING APPARATUS FOR PRECISELY FEEDING LOOSE BULK MATERIAL

FIELD OF THE INVENTION

The invention relates to a dosing apparatus for precisely feeding loose bulk material, especially in the form of powdered or fine grained material. Such a dosing apparatus includes a container or housing for the loose bulk material, a driven turntable, and a stripper. The loose bulk material is deposited on the turntable from the container and is then stripped off the turntable for discharging a metered quantity from the container by means of the stripper.

BACKGROUND INFORMATION

German Patent Publication (DE-PS) 2,636,521 discloses a known conveyor apparatus for powdered material. The known conveyor includes a turntable, a storage container arranged above the turntable, and several strippers of which a primary or coarse stripper produces a uniform layer thickness of powder on the turntable, and at least one further stripper strips or strikes the uniform layer of powdered material off the turntable. Such an arrangement has the disadvantage that it requires a coarse stripper and that the surplus material stripped off by the coarse stripper must somehow again be returned into the container. Further, the loose powder material could possibly flow from a pouring feed cone on the turntable directly to the final dosing stripper without having been stripped to the appropriate layer thickness by the first course stripper. Such a direct flow leads to non-uniformly dosed streams of loose powdered material.

European Patent Publication (EP-BL) 0,112,398 discloses another known apparatus for precisely dosing or feeding loose bulk materials by using dosing rollers having grooves machined in their surfaces and which rotate on a horizontally arranged shaft. In apparatus of the above type there is a danger or disadvantage that the loose bulk material may become too greatly compacted in the grooves of the dosing rollers or that the loose bulk material falls out of the grooves too early due to gravity. Such failures lead to a non-uniform discharge or feed stream of the material.

The known apparatus volumetrically dose or feed precisely the loose bulk material. However, known devices generally only operate with a relatively low output or conveying volumes which may, for example, only amount to a few grams per hour. turntable or rollers are driven at a constant rotational speed, whereby a single, non-adjustable output rate is provided.

OBJECTS OF THE INVENTION

In view of the foregoing it is the aim of the invention to achieve the following objects singly or in combination:

to construct a dosing or feed apparatus for precisely feeding exact quantities of loose bulk materials in such a manner that stripper means can strip a precise quantity of loose material from a rotating turntable;

to construct such a dosing apparatus in a manner so that there is no stream of surplus material which must be returned to the material storage container;

to ensure that no spill over of material or other failures can occur in such a dosing apparatus so that a uniform and precisely dosed output stream of loose output material is achieved;

to avoid excessive compaction of the discharged loose material in such a dosing apparatus and thereby to avoid fluctuations of the output stream of material;

to allow the rotational speed of the rotating turntable of such a dosing apparatus to be adjusted so that the discharge rate of loose bulk material can be adjusted to a desired dosing or output feed rate; and to achieve, after adjustment, a dosing or feeding accuracy and constancy so that the output rate is consistently repeatable.

SUMMARY OF THE INVENTION

The dosing apparatus according to the invention includes a cylindrical container for storing the loose bulk material to be fed or dosed. A rotatable turntable substantially closes the bottom of the cylindrical container. A discharge groove is arranged around the circumference of the rotating turntable. The discharge groove opens radially outwardly for delivering exact quantities of bulk material out of the container. A stripper reaches into the discharge groove to strip loose bulk material from the groove to thereby discharge the material from the container. The arrangement of the discharge groove along the circumference of the rotating turntable assures an output rate of the discharge stream of the bulk material which is clearly defined by the rotational speed of the rotating turntable. Therefore, the discharge rate may be simply yet precisely adjusted by adjusting the rotational speed of the drive means of the turntable.

Further, according to the invention the discharge groove may be partially covered on top. In this embodiment openings are provided in the top cover of the discharge groove so that the loose material may enter the discharge groove from above. A cover plate is arranged above the immediate area of the stripper and the discharge opening of the container to prevent uncontrolled flowing of the loose material out of the container. Furthermore, stirring means may be arranged in the material storage container to cooperate with deflector or guide elements arranged around the inner surface of the container above the discharge groove for assuring that the discharge groove is uniformly filled with loose material without excessive compaction or compressing of the loose material into the discharge groove.

For gravimetrically dosing or feeding a discharge stream of loose bulk material the dosing apparatus as described above may be arranged on a scale or weighing means. The weighing comprise a control apparatus which generates a signal for controlling the rotational speed of the drive for the rotating turntable. In this manner it is assured that a discharge stream may be precisely gravimetrically dosed or fed and may be simply adjusted to a desired discharge rate.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
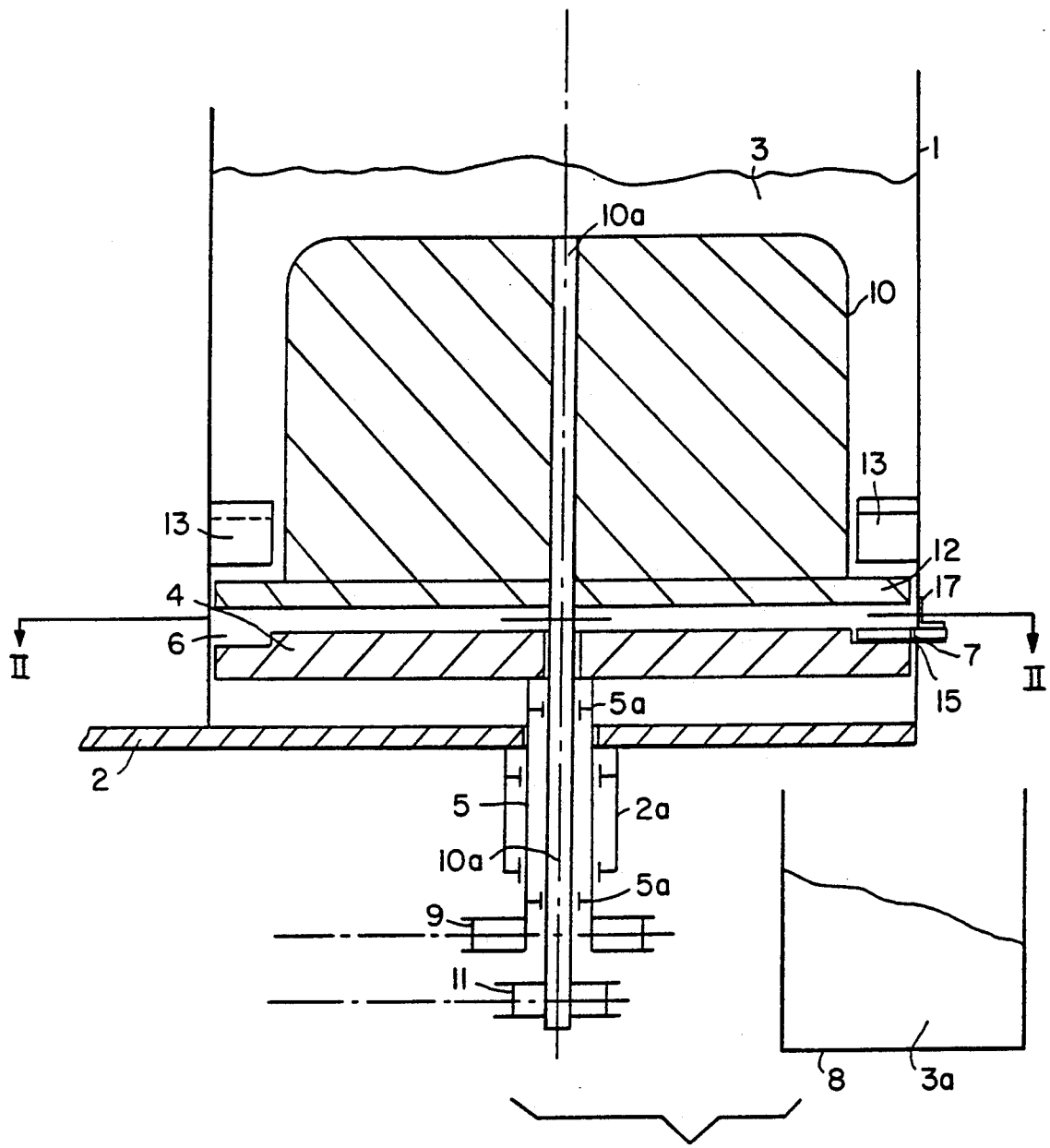
FIG. 1 schematically shows a vertical cross-section through a dosing or metering apparatus according to the invention for precisely feeding exact quantities of loose bulk material.

As shown in FIG. 1, the dosing or feeding apparatus according the invention includes a cylindrical container 1 mounted on a base plate 2. The loose bulk material 3 which is to be dosed feed is placed into the container 1. A rotating turntable 4 is arranged near the bottom of the container 1, that is near the base plate 2 so that the rotating turntable 4 effectively closes the bottom of the container 1 to prevent uncontrolled escape of the loose material 3. The turntable 4 is mounted on a hollow shaft 5 which is rotatably supported in the base plate 2 by bearings 2a. The hollow shaft 5 and thus the turntable 4 is driven by a schematically indicated drive 9 at a relatively low rotational speed which is generally only a few revolutions per minute.

A discharge groove 6 runs around and along next to the circumference of the turntable 4 and opens radially outwardly. A discharge opening 15 is provided in the wall of the container 1 near the discharge groove 6. A stripper 7 reaches into the discharge groove 6 in the area of the discharge opening 15. The stripper 7 is, for example, attached to the wall of the container 1 so that it is stationary relative to the rotation of the turntable 4, whereby the material is removed when the turntable groove 6 moves past the stripper 7 because the stripper 7 strips the dosed loose material out of the discharge groove 6 and out through the discharge opening 15 to drop, e.g., into a receiving receptacle 8 outside the storage container 1. The receiving receptacle 8 may be transported by conveying means of conventional construction. Metered bulk material 3a falls into the receptacle 8.

Stirring means 10 are arranged within the container 1 on a drive shaft 10a which is rotationally supported in the hollow shaft 5 by bearings 5a. The drive shaft 10a extends through the hollow shaft 5 of the turntable 4. Drive means 11 which are only schematically indicated, drive the shaft 10a and thus the stirring means 10. The stirring means 10 are driven in the same rotational direction, but at a higher rotational speed than the turntable 4. However, in an alternative embodiment the mixing means 10 may be driven in an opposite rotational direction than the turntable 4. The stirring means 10 comprise several stirring paddles 12 which are preferably arranged directly above the turntable 4. A plurality of wedge-shaped deflecting and guiding elements 13 are arranged around the inside wall of the container 1 and extend radially inwardly substantially across the radial width of the discharge groove 6. The deflecting and guiding elements 13 cooperate with the stirring paddles 12 for achieving a uniform filling of loose material 3 into the guide channel 6.

Figure 2A:
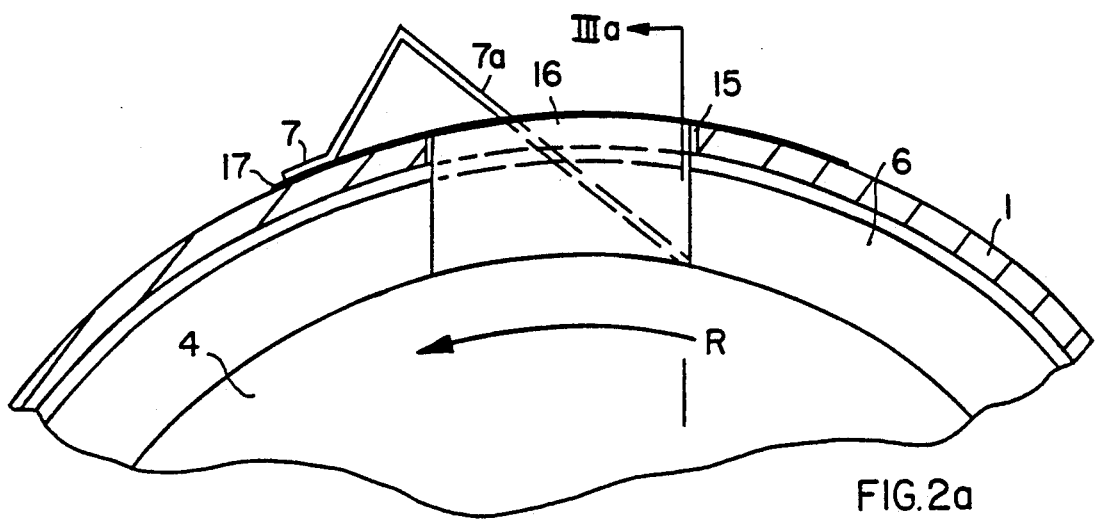
FIG. 2a is a partial horizontal sectional view along the line II—II of FIG. 1, showing the area of a discharge opening covered with a stationary cover in the apparatus according to the invention.

FIG. 2a shows a partial horizontal sectional detailed view of the discharge area of the apparatus according to the invention. The stripper 7 has a leg 7a slanting against the direction R of rotation of the turntable 4 and reaching through a discharge slot 15 in the wall of the container 1 into the discharge groove 6. The edges of the slanted stripper leg 7a rest against the horizontal and vertical walls of the groove 6, thereby guiding bulk material 3 out of the groove 6. A thin cover plate 16 covers the stripper 7 and the stripper area above the discharge slot 15. The cover plate 16 reaches radially inwardly at least to the radially inner edge of the discharge groove 6 for preventing loose bulk material 3 from escaping the container 1 in an uncontrolled manner. The stripper 7 and the cover plate 16 are attached to the container 1 by means of a bracket 17.

While the embodiment shown in FIG. 2a has a straight or angular stripper 7, the portion of the stripper which reaches into the discharge groove 6 may alternatively be curved or plow shaped. Furthermore, the stripper 7 may be rigid or may be elastic. As the turntable 4 rotates in the direction R, the loose material carried in the discharge groove 6 is smoothly and effectively removed from the groove 6 by the stripper 7 and discharged through the opening 15.

Figure 2B:
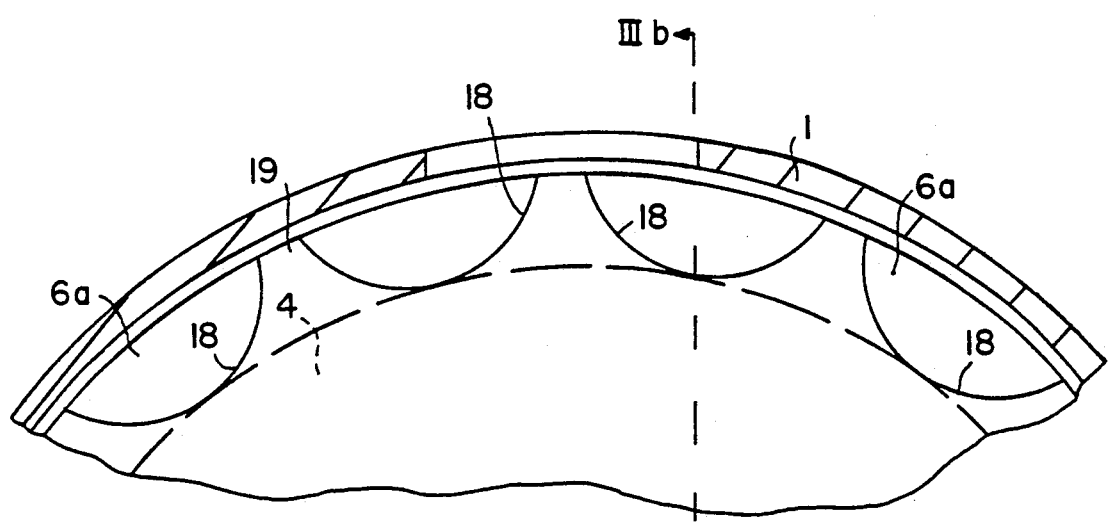
FIG. 2b is a view similar to that of FIG. 2a, wherein the discharge groove is covered with a cover having semicircular openings above the discharge groove and wherein the stripper arrangement is not shown for clarity.

FIG. 2b is a view similar to that of FIG. 2a, but for clarity does not show the stripper arrangement 7. FIG. 2b shows a cover 19 of the groove 6a in the turntable 4. As shown in FIG. 2b, the groove 6a is partially covered from above by the cover 19 which comprises semicircular openings 18 near its circumference for admitting material into the discharge groove 6a. The cover 19 partially covering the discharge groove 6a may, for example be a thin sheet metal member which rotates with the turntable 4. Alternatively, the discharge groove 6a may be machined into the circumferential edge of the turntable 4, whereby the top cover 19 remains as a piece or extension of the turntable 4 with upwardly open holes therein for the bulk material to enter the groove 6a. The cover 19 prevents the loose material 3 from being compressed or compacted into the discharge groove 6a, whereby the precision or accuracy of the dosing is improved.

Figure 2C:
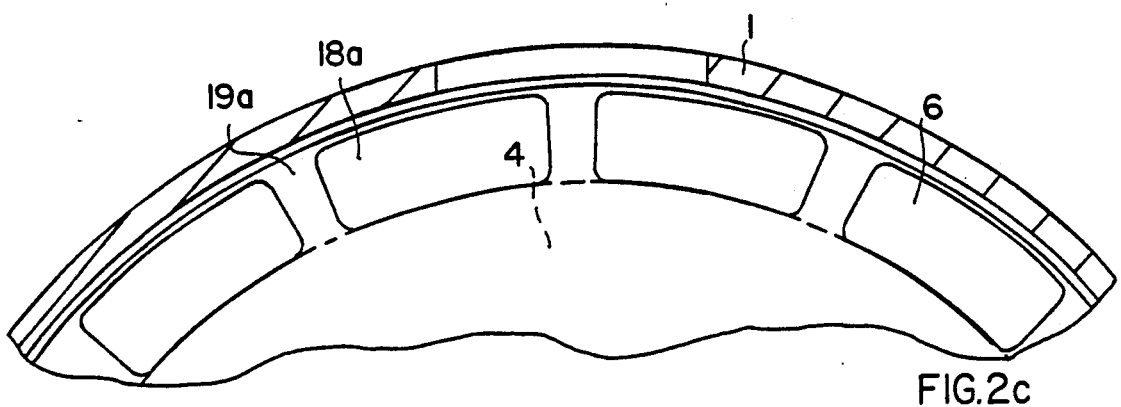
FIG. 2c is a view similar to that of FIG. 2b, but showing a further embodiment of a partially covered discharge groove whereby the cover has substantially rectangular openings.

FIG. 2c is a view similar to that of FIG. 2b, but showing an alternative embodiment of a partial cover 19a having openings 18a for the loose material 3 to flow from the container 1 into the discharge groove 6. These openings 18a are shown to have a substantially rectangular shape rather than the semicircular opening shape shown in FIG. 2b. However, these openings may have any suitable configuration.

Figure 3A:
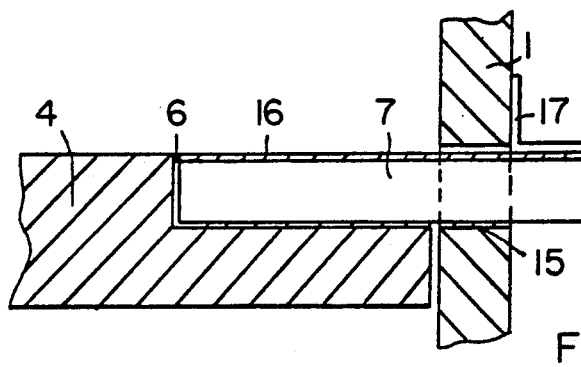
FIG. 3a is a partial vertical sectional view approximately along the line IIIa in, FIG. 2a and showing a detail of the stationary cover in the area of a discharge opening.
Figure 3B:
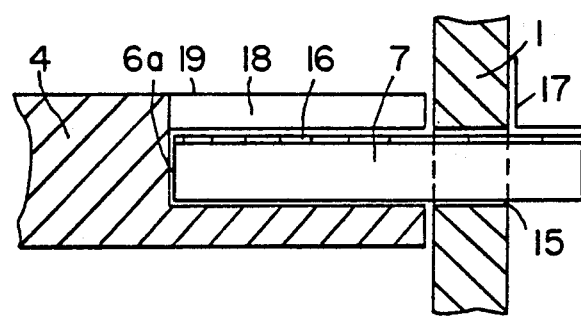
FIG. 3b is a view similar to that of FIG. 3a, showing a section approximately along the line IIIb in FIG. 2b, illustrating a detail of one type of top cover for the discharge groove.

FIGS. 3a and 3b show vertical sections through two possible alternative embodiments of the discharge groove 6 in the turntable 4.

FIG. 3a shows a turntable 4 with a discharge groove 6 which is essentially open radially outwardly and axially upwardly. The stripper 7 reaches with its leg 7a into the discharge groove 6 as described. The cover plate 16, e.g. of sheet metal, is arranged above the discharge groove 6 to cover the area of the stripper 7, specifically the stripper leg 7a. The discharge groove 6 has a rectangular cross-section but may have other appropriately cross-sectional shapes in alternative embodiments, e.g. a square cross-section or any other suitable cross-section. In any event, the stripper 7 has the same shape as the cross-section of the discharge groove 6 so that all the loose material is effectively stripped out of the discharge groove 6.

FIG. 3b is a vertical sectional detail through a rotating turntable 4 and discharge groove 6a covered by a cover resulting when the groove 6a is machined into the circumferential edge of the turntable 4 so that a top cover 19 remains, whereby, the discharge groove 6a is only completely open in a radially outward direction, while, openings 18 in the top cover 19 provide access into the discharge groove 6a for the bulk material passing from the container 1 through the openings 18 into the discharge groove 6a where it is then stripped out by the stripper 7 to be discharged from the opening 15 in the container wall 1.

Figure 4:
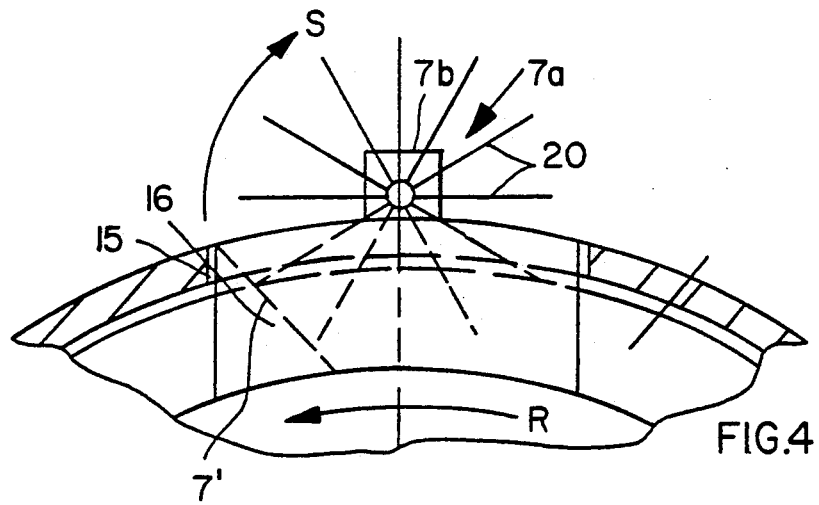
FIG. 4 is a detailed horizontal sectional view similar to that of FIG. 2a, but showing a rotary stripper having several stripper elements or paddles.

FIG. 4 shows an alternative embodiment of a stripper 7a in the form of a rotational stripper 7a rotating in the direction of the arrow S. The rotating stripper 7a comprises a plurality of stripper paddles 20 which reach through the discharge opening 15 into the discharge groove 6 or 6a. The paddles 20 strip the loose bulk material 3 from the discharge groove 6, whereby an auxiliary stripper wall 7' prevents the loose material from spilling from the stripper paddles 20 back into the discharge groove 6 or 6a. Drive means 7b for the rotating stripper 7a are shown in block form since any suitable conventional drive can be used. The rotational direction S of the rotating stripper 7 is shown to be opposite the rotational direction R of the rotating turntable 4. However, other rotational direction combinations are also possible.

The dosing apparatus described herein may be used in combination with a weighing apparatus or scale for carrying out gravimetric dosing or feeding of a loose bulk material stream. To achieve this, the above described dosing or metering or feeding apparatus is arranged on the weighing apparatus. Then in a known manner the weighing apparatus comprises evaluating circuit means and a control arrangement for generating a signal to control the rotational speed of the turntable 4 in a closed loop manner, whereby the discharge rate of the dosed material may be adjusted.

Figure 5:
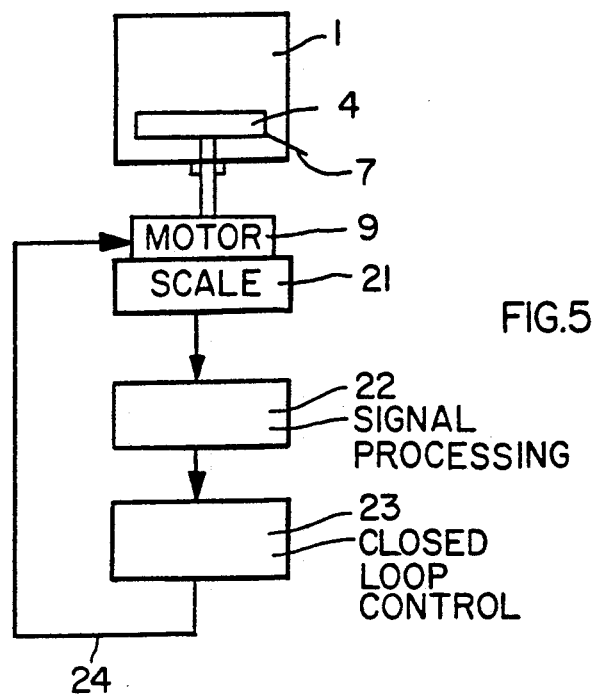
FIG. 5 is a block diagram of a loss-in-weight-system with the present apparatus combined with a platform scale and scale output circuit means for controlling the rotational speed of a turntable for discharging bulk material.

FIG. 5 shows the present apparatus supported with its container 1, turntable 4, and drive motor 9 on a platform scale 21 which weighs the instantaneous weight of the entire apparatus to produce a respective output signal. The scale 21 can, for example be of the type known as SIMPLEX loss-in-weight-system mode PHR, manufactured by Carl Schenck AG of Darmstadt, Federal Republic of Germany. A signal processing circuit 22, which may be part of the scale, deducts the instantaneous value from the initial filled value to produce a control value representing the actual feed rate of bulk material. The control signal is compared in the closed loop control cricuit 23 with a rated feed rate signal stored in the circuit 23 which may include, in addition to a memory and a comparator, an amplifier. The output 24 of the circuit 23 is supplied as a control signal to the drive motor 9 of the turntable 4. If the actual feed rate coincides with the rated feed rate no control is effected. If the actual feed rate exceeds the rated rate, the motor 9 is slowed down in the closed loop control until the rates coincide again. If the actual rate is lower than the rated rate, the motor 9 is accelerated until coincidence is established again.

Figure 6:
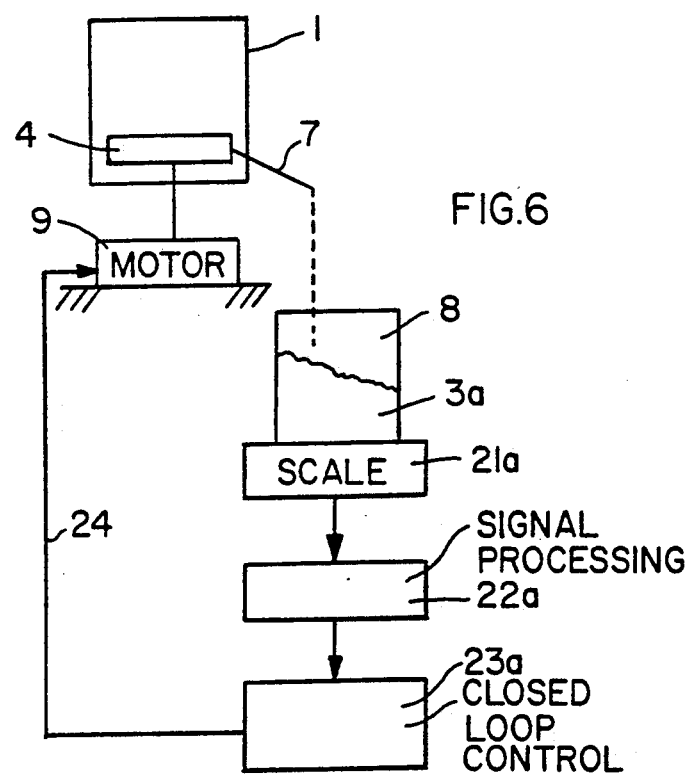
FIG. 6 is a block diagram similar to that of FIG. 5 and showing a modified scale arrangement.

FIG. 6 is an embodiment similar to that of FIG. 5, whereby the volumetrically metered out quantity 3a in the receptacle 8 is weighed directly on a scale 21a. The circuit 22a compares the actual rate signal from the scale 21a with a rated rate signal which is stored in the circuit 22a. The signal is then, for example, amplified at 23a and supplied at 24 to the motor 9. Except for the formation of the difference signal in FIG. 5, both circuits control the operation of the motor 9 in a closed loop manner for driving the turntable 4 at the desired feed rate.

Although the invention has been described with reference to specific example embodiments, it will be appreciated that it is intended to cover all modifications and equivalents within the scope of the appended claims.

What we claim is:

1. A dosing or feeding apparatus for feeding precisely measured portions of loose bulk material, especially powdered or fine grained material, comprising a cylindrical container for storing said bulk material, rotating turntable means arranged for substantially closing a bottom end of said cylindrical container, said turntable means comprising a discharge groove having a defined vertical cross-sectional groove area, said discharge groove being arranged around said turntable next to its circumference, said discharge groove opening radially outwardly, drive means arranged for rotating said turntable means, a discharge opening in said container, and stripper means reaching into said discharge groove through said discharge opening, said stripper means being so dimensioned and positioned that said stripper means substantially completely cover said vertical cross-sectional groove area for stripping said precisely measured portions of bulk material out of said groove through said discharge opening with each revolution of said turntable.

2. The apparatus of claim 1, wherein said defined vertical cross-sectional groove area of said discharge groove is a substantially rectangular, radial cross-section.

3. The apparatus of claim 1, wherein said rotating turntable means further comprise top cover means covering said discharge groove upwardly and radially outer openings in said top cover means for admitting bulk material into said discharge groove.

4. The apparatus of claim 3, wherein said top cover means comprise a disk with cut-out notches around a circumference of said cover disk to form said openings.

5. The apparatus of claim 4, wherein said cut-out notches have a semi-circular shape.

6. The apparatus of claim 3, wherein said openings are through-holes having a substantially rectangular shape.

7. The apparatus of claim 1, further comprising a discharge cover plate arranged above said stripper means and above said discharge opening to prevent bulk material from falling directly out of said container through said discharge opening.

8. The apparatus of claim 1, wherein said stripper means comprise a rigid angled arm held in a fixed position next to said discharge opening for said angled arm to reach into said discharge groove.

9. The apparatus of claim 1, wherein said stripper means is relatively flexible or elastic.

10. The apparatus of claim 1, further comprising stirring means including a vertical shaft and horizontally extending paddles arranged on said axle for uniformly distributing said bulk material into said discharge groove of said turntable means.

11. The apparatus of claim 10, further comprising deflecting elements (13) arranged inside said container and immediately above said paddles (12) for cooperating with said paddles in said distributing of said bulk material into said discharge groove.

12. The apparatus of claim 1, wherein said stripper means comprise rotatable stripper means, a shaft for rotatably supporting said rotatable means including a plurality of stripper elements arranged around said shaft, and drive means for driving said stripper means.

13. The apparatus of claim 1, further comprising differential weighing means for gravimetrically feeding bulk material, said feeding apparatus being positioned on said differential weighing means, weighing signal evaluating means connected to said differential weighing means for providing a difference signal that represents the difference between the initial filled weight and the instantaneous weight of said feeding apparatus, said difference signal providing a control signal for said drive means of said turntable means for controlling the rotational speed of said turntable means in a closed loop manner.

14. The apparatus of claim 1, further comprising weighing means for gravimetrically weighing volumetrically metered bulk material, said weighing means carrying a receptacle for receiving volumetrically metered bulk material, weighing signal evaluating means connected to said weighing means for providing a control signal representing an instantaneously weighed quantity, and control means receiving said control signal and connected to said drive means for controlling the rotational speed of said turntable means in a closed loop manner.

15. A dosing or feeding apparatus for precisely feeding loose bulk material, especially powdered or fine grained material, comprising a cylindrical container for storing said bulk material, rotating turntable means arranged for substantially closing a bottom end of said cylindrical container, said turntable means comprising a ring discharge groove having a limited radial depth in a circumferential zone of said turntable means, said discharge groove opening radially outwardly, drive means arranged for rotating said turntable means, a discharge opening in said container, stripper means reaching into said discharge groove through said discharge opening for stripping bulk material out of said discharge groove through said discharge opening, and wherein said rotating turntable means comprise top cover means covering said discharge groove upwardly, said top cover means having openings in its circumferential ring zone for admitting bulk material into said ring discharge groove, and deflecting elements (13) arranged inside said cylindrical container means for cooperation with said top cover means to screed bulk material through said openings into said ring discharge groove when said turntable means rotate.

16. A dosing or feeding apparatus for precisely feeding loose bulk material, especially powdered or fine grained material, comprising a cylindrical container for storing said bulk material, rotating turntable means arranged for substantially closing a bottom end of said cylindrical container, said turntable means comprising a discharge groove arranged around said turntable next to its circumference, said discharge groove opening radially outwardly, drive means arranged for rotating said turntable means, a discharge opening in said container, stripper means reaching into said discharge groove through said discharge opening for stripping bulk material out of said groove through said discharge opening, stirring means including a vertical shaft and horizontally extending paddles arranged on said axle for uniformly distributing said bulk material into said discharge groove of said turntable means, and deflecting elements (13) arranged inside said container and immediately above said paddles (12) for cooperating with said paddles in said distributing of said bulk material into said discharge groove.

* * * * *